(12) United States Patent
Gu et al.

(10) Patent No.: US 8,743,348 B2
(45) Date of Patent: Jun. 3, 2014

(54) OPTICAL DISTANCE DETECTION SYSTEM

(75) Inventors: Ren Hau Gu, Hsin-Chu (TW); En Feng Hsu, Hsin-Chu (TW); Chi Chieh Liao, Hsin-Chu (TW); Yi Fang Lee, Hsin-Chu (TW); Chih Hung Lu, Hsin-Chu (TW); Chung You Wu, Hsin-Chu (TW)

(73) Assignee: Pixart Imaging Inc., Hsin-Chu County (TW)

( * ) Notice: Subject to any disclaimer, the term of this patent is extended or adjusted under 35 U.S.C. 154(b) by 236 days.

(21) Appl. No.: 13/220,995

(22) Filed: Aug. 30, 2011

(65) Prior Publication Data

US 2011/0317146 A1 Dec. 29, 2011

(30) Foreign Application Priority Data

Sep. 3, 2010 (TW) ............................... 99129834 A
Jan. 25, 2011 (TW) ............................... 100102690 A

(51) Int. Cl.
*G01C 3/08* (2006.01)
(52) U.S. Cl.
USPC ....................................................... 356/4.03
(58) Field of Classification Search
USPC ....................................................... 356/4.03
See application file for complete search history.

(56) References Cited

U.S. PATENT DOCUMENTS

| 6,350,981 | B1 | 2/2002 | Uno |
| 6,370,331 | B1 | 4/2002 | Okubo |
| 6,549,058 | B1 | 4/2003 | Bondarev |
| 6,972,834 | B1 | 12/2005 | Oka et al. |
| 6,977,631 | B2 * | 12/2005 | Melville et al. ................. 345/32 |
| 7,538,813 | B2 * | 5/2009 | Wernersson .................. 348/345 |
| 2010/0045963 | A1 * | 2/2010 | Yamaguchi et al. ......... 356/4.01 |

* cited by examiner

*Primary Examiner* — Isam Alsomiri
*Assistant Examiner* — Vicente Rodriguez
(74) *Attorney, Agent, or Firm* — Lowe Hauptman & Ham, LLP

(57) ABSTRACT

There is provided an optical distance detection system which includes a light source and a detection device. The light source is configured to illuminate a surface of an object. The detection device is configured to receive a reflected light from the surface of the object and to output a distance of the object according to the reflected light. The detection device includes a sensing module and a calculation module. The sensing module is configured to receive the reflected light to accordingly generate an image. The calculation module is for outputting the distance according to a light spot position and a light spot size of the reflected light forming on the image.

20 Claims, 6 Drawing Sheets

OPTICAL DISTANCE DETECTION SYSTEM

CROSS REFERENCE TO RELATED APPLICATION

This application claims the priority benefit of Taiwan Patent Application Ser. No. 099129834, filed on Sep. 3, 2010 and Taiwan Patent Application Ser. No. 100102690, filed on Jan. 25, 2011, the full disclosure of each of the above-listed prior applications is incorporated herein by reference.

BACKGROUND

1. Field of the Invention

This invention generally relates to a distance detection system and, more particularly, to an optical distance detection system capable of compensating a detected distance according to a size and a symmetry of a detected light spot.

2. Description of the Related Art

In conventional technology, an optical distance detection device emits a detection light to an object under test and receives a reflected light of the detection light reflected by the object under test so as to generate a light spot corresponding to the object under test. Next, the optical distance detection device can derive a distance between the optical distance detection device and the object under test with trigonometry according to a spatial relationship between every component included therein and a light spot position of the light spot.

However, when a surface of the object under test is not fully illuminated by the detection light, the optical distance detection device is not able to generate a complete image of the light spot according to the reflected light reflected by the object under test. Therefore, the optical distance detection device can not obtain a correct light spot position when calculating the distance of the object under test; a larger measurement error can occur. Thus a correct distance of the object under test can not be calculated correctly thereby causing inconvenience in use.

Accordingly, an optical distance detection device capable of correctly calculating the distance of an object under test even without acquiring a complete image of the object needs to be provided.

SUMMARY

The present invention provides an optical distance detection device capable of compensating a light spot position according to a light spot size and a symmetry variation of an energy curve thereby increasing the accuracy of distance detection.

The present invention provides an optical distance detection device including a light source and a detection device. The light source is configured to illuminate a surface of an object. The detection device is configured to receive a reflected light from the surface of the object and output a distance of the object according to the reflected light. The detection device further includes sensing module and a calculation module. The sensing module is configured to receive the reflected light to accordingly generate an image. The calculation module is for compensating a light spot position according to a light spot size of the reflected light forming on the image, calculating and outputting the distance of the object according to a compensated light spot position.

In an aspect, the sensing module further includes a light sensing unit and an image processing unit. The light sensing unit is configured to receive the reflected light and generate an electric signal. The image processing unit is for receiving the electric signal and generating the image.

In an aspect, the calculation module further includes a calculation unit and an output unit. The calculation unit is for receiving the image, compensating the light spot position according to the light spot size of the reflected light forming on the image, and calculating the distance according to the compensated light spot position. The output unit is for receiving the distance obtained by the calculation unit and outputting the distance.

In an aspect, the calculation module further includes a memory unit for storing a predetermined light spot size. The calculating unit is further for comparing the light spot size and the predetermined light spot size after receiving the image, and compensating the light spot position according to a comparison result of comparing the light spot size and the predetermined light spot size.

In an aspect, the calculation unit calculates the distance according to the light spot position, which is uncompensated, when the light spot size is substantially equal to the predetermined light spot size; and the calculation unit compensates the light spot position according to a size difference between the light spot size and the predetermined light spot size when the light spot size is smaller than the predetermined light spot size, and calculates the distance according to the compensated light spot position.

The present invention further provides an optical distance detection device including a light source, a detection lens and a detection device. The light source is configured to illuminate a surface of an object. The detection device is configured to detect a light spot formed by a reflected light reflected from the surface of the object, penetrating the detection lens and forming on the detection device, to compensate a light spot position according to a light spot size of the light spot, and to determine a compensation direction of the light spot position according to symmetry of an energy curve of the light spot.

The present invention further provides an optical distance detection device including a light source, a detection lens and a detection device. The light source is configured to illuminate a surface of an object. The detection device is configured to detect a light spot formed by a reflected light reflected from the surface of the object, penetrating the detection lens and forming on the detection device, and to determine a compensation direction of a light spot position of the light spot according to symmetry of an energy curve of the light spot.

The optical distance detection device of the present invention is preferably for detecting a distance between a substantially flat surface of an object and the distance detection system, wherein the surface of the object may have an arbitrary reflection coefficient.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE EMBODIMENT

Figure 1:
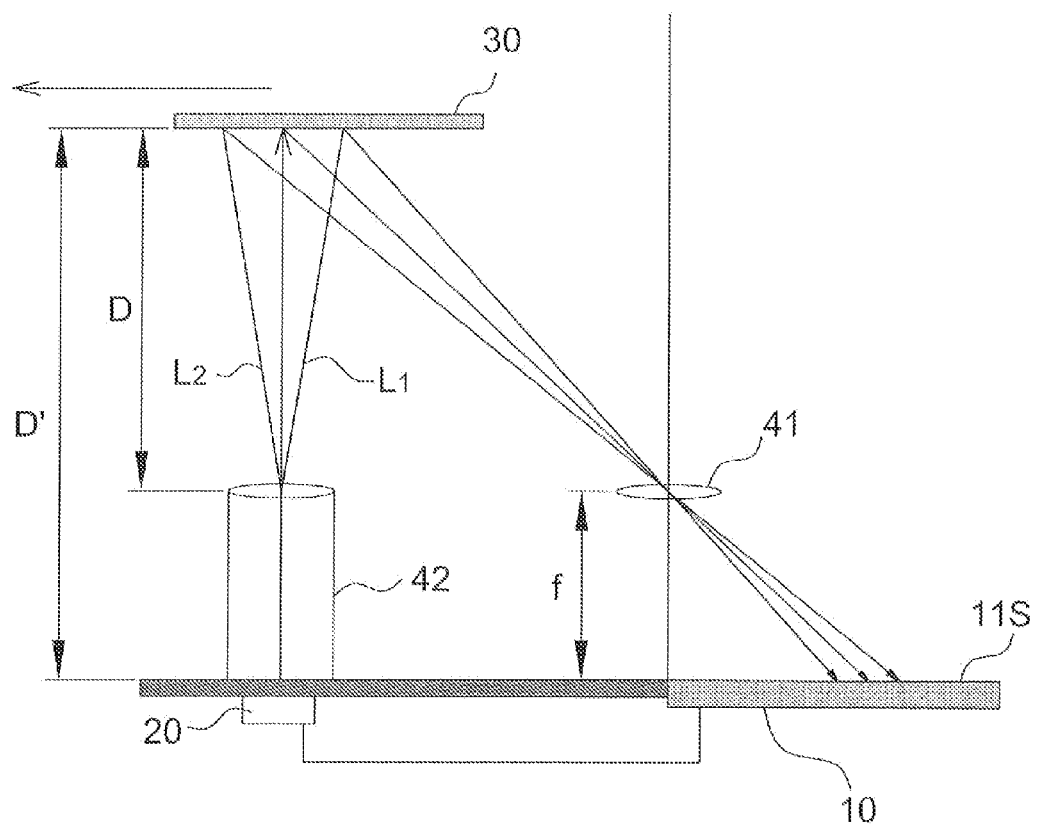
FIG. 1 shows a schematic diagram of the optical distance detection system according to an embodiment of the present invention.

In the drawings of the present invention, only a part of the components are shown and other components that are not directly related to the present invention are omitted.

The present invention is related to an optical distance detection system that performs the distance measurement by using optical imaging technology. Please refer to FIG. 1, it shows a schematic diagram of the optical distance detection system according to an embodiment of the present invention, which includes a detection device 10 and a light source 20. The light source 20 projects light, e.g. light $L_1$ and $L_2$, to a surface of an object 30. The light $L_1$ and $L_2$ is reflected from the surface of the object 30 to the detection device 10 to form a light spot. The detection device 10 then calculates a distance between the object 30 and the light source 20 with trigonometry according to an image position of the light spot (i.e. a light spot position) formed by the reflected light on the detection device 10 and a spatial relationship between every component included in the optical distance detection system.

A detection lens 41 may be disposed between the detection device 10 and the object 30 configured to condense the reflected light from the surface of the object 30 to a sensing surface 11S of the detection device 10. In addition, an emission lens 42 may be disposed in front of the light source 20 to increase the emission efficiency thereof thereby increasing the efficiency of the light projection on the surface of the object 30. In other embodiments, the emission lens 42 may be omitted such that the light source 20 directly projects the light on the surface of the object 30.

If there is the emission lens 42 disposed in front of the light source 20, a distance to be calculated may be the distance D from a front end of the emission lens 42 to the object 30 as shown in FIG. 1. In other embodiments, if the emission lens 42 is not implemented, the distance to be calculated may be the distance D' from an emitting surface of the light source 20 to the object 30 as shown in FIG. 1.

According to the imaging principle, when the light $L_1$ and $L_2$ is projected by the light source 20 on the surface of the object 30 and then reflected to the surface of the detection device 10, the reflected light first penetrates the detection lens 41 and then reaches the sensing surface 11S of the detection device 10. In this embodiment, it is assumed that a perpendicular distance between the sensing surface 11S of the detection device 10 and the detection lens 41 is f. If the detection lens 41 is, for example a convex lens, the distance f is the focal length of the detection lens 41.

The distance between the detection device 10 and the light source 20 is fixed and may be obtained previously, and the focal length f of the detection lens 41 may also be obtained previously. Thus, the optical distance detection system may calculate the distance D or D' between the object 30 and the light source 20 with trigonometry according to a light spot position of the reflected light forming on the sensing surface 11S of the detection device 10 and a spatial relationship between every component thereof, e.g. the focal length f of the detection lens 41 and the distance between the detection device 10 and the light source 20, wherein the method of calculating the distance mentioned above is well known to the art and thus details thereof will not be repeated herein. In addition, the optical distance detection system of the present invention is preferably configured to detect the distance D or D' between an object having substantially flat surface and the optical distance detection system.

Figure 2:
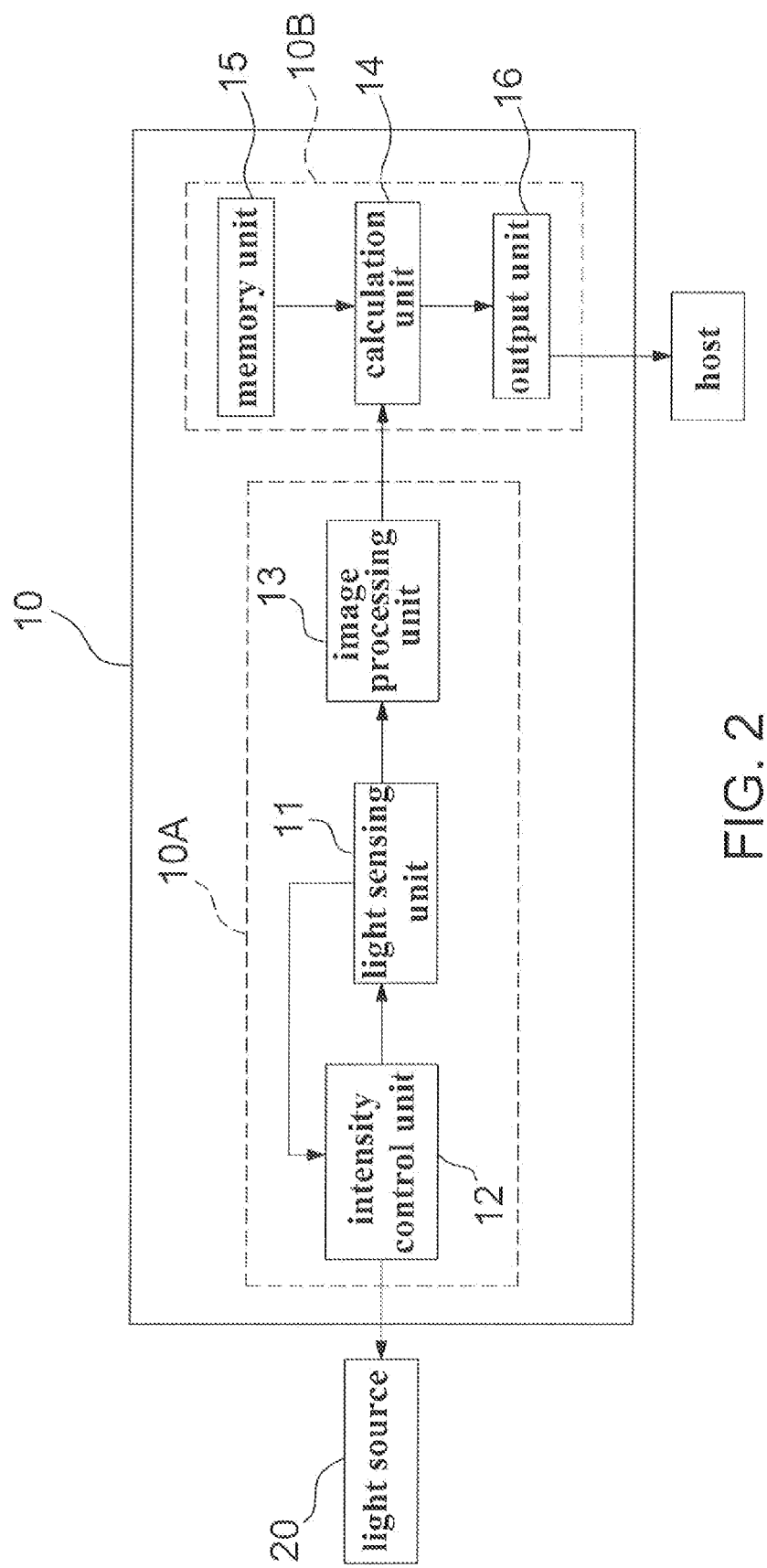
FIG. 2 shows a block diagram of the optical distance detection system according to an embodiment of the present invention.

Please refer to FIG. 2, it shows a block diagram of the optical distance detection system according to an embodiment of the present invention. The detection device 10 includes a sensing module 10A and a calculation module 10B. The sensing module 10A includes a light sensing unit 11, an intensity control unit 12 and an image processing unit 13. The calculation module 10B includes a calculation unit 14, a memory unit 15 and an output unit 16.

The light sensing unit 11 has a sensing surface 11S (as shown in FIG. 1) configured to sense the intensity of the reflected light. The reflected light may form a light spot on the sensing surface 11S of the light sensing unit 11. Embodiments of the light sensing unit 11 include a CCD image sensor, a CMOS image sensor or the like. The intensity control unit 12 is configured to control the sensing parameter (e.g. aperture, speed and etc.) of the light sensing unit 11 during operation, and may further control the emitting intensity of the light source 20 thereby improving the sensing efficiency of the light sensing unit 11. The light sensing unit 11 generates electric signals after sensing the reflected light. The image processing unit 13 is for receiving the electric signals generated by the light sensing unit 11 and generating an image containing the light spot. In addition, when generating the image containing the light spot, the image processing unit 13 may perform the image processing such as filtering, dimension conversion (e.g. from 2-dimension to 1-dimension), image stacking and etc. so as to increase the accuracy of position calculation, wherein the image processing techniques mentioned above are well known to the art and thus details thereof will not be repeated herein.

The calculation unit 14 receives the image outputted from the image processing unit 13 so as to accordingly calculate a distance D or D' between the object 30 and the light source 20. The output unit 16 outputs the distance calculated by the calculation unit 14 to a host so as to execute corresponding applications, such as controlling the motion of a cursor (not shown) shown on a display, but the present invention is not limited thereto. The memory unit 15 stores a predetermined light spot size and a lookup table of a light spot ratio (i.e. a ratio between a detected light spot size and the predetermined light spot size) and a compensation amount of light spot position, wherein the predetermined light spot size and the lookup table may be measured and stored before the shipment of the optical distance detection system. Before calculating the distance, the calculation unit 14 first compares a detected light spot size of the reflected light, e.g. $L_1$ and $L_2$, forming on the light sensing unit 11 with the predetermined light spot size so as to calculate the light spot ratio, wherein the light spot ratio is defined as (the detected light spot size/the predetermined light spot size) herein. The calculation unit 14 identifies, according to the light spot ratio, whether the reflected light received by the light sensing unit 11 includes a part of a predetermined amount of the light projected by the light source 20 or includes substantially all the predetermined amount of the light projected by the light source 20. If the calculation unit 14 identifies that the detected light spot size is substantially identically to the predetermined light spot size, the distance may be calculated directly. However, if the detected light spot size is identified to be smaller than the predetermined light spot size, the detected light spot will be compensated first according to the lookup table and the distance will then be calculated according to a compensated light spot size, wherein the compensation method will be described hereinafter.

Figure 3:
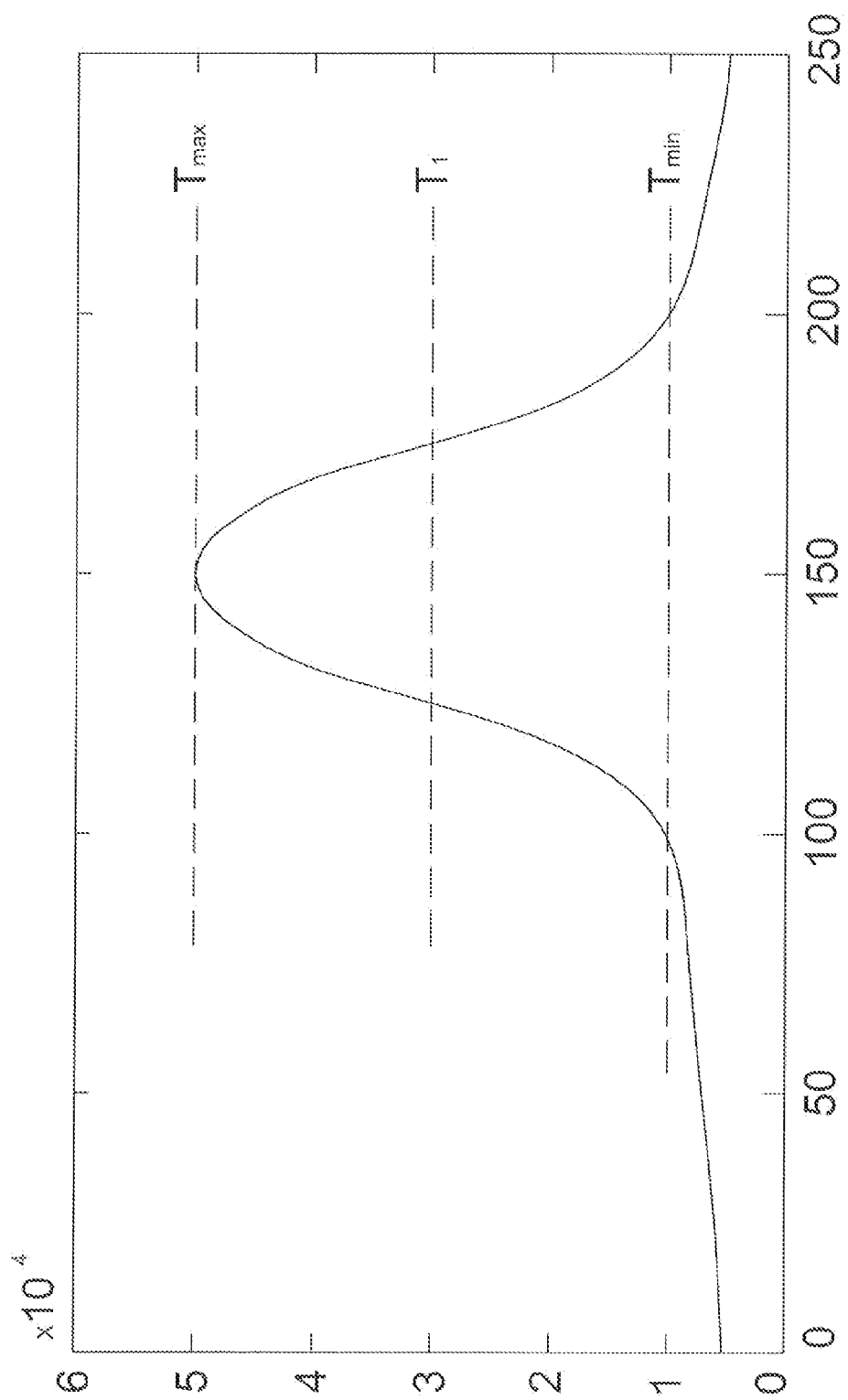
FIG. 3 shows a schematic diagram of a light spot area formed by acquiring the reflected light reflected from the surface of the object by using the sensing module according to the embodiment of the present invention.
Figure 4:
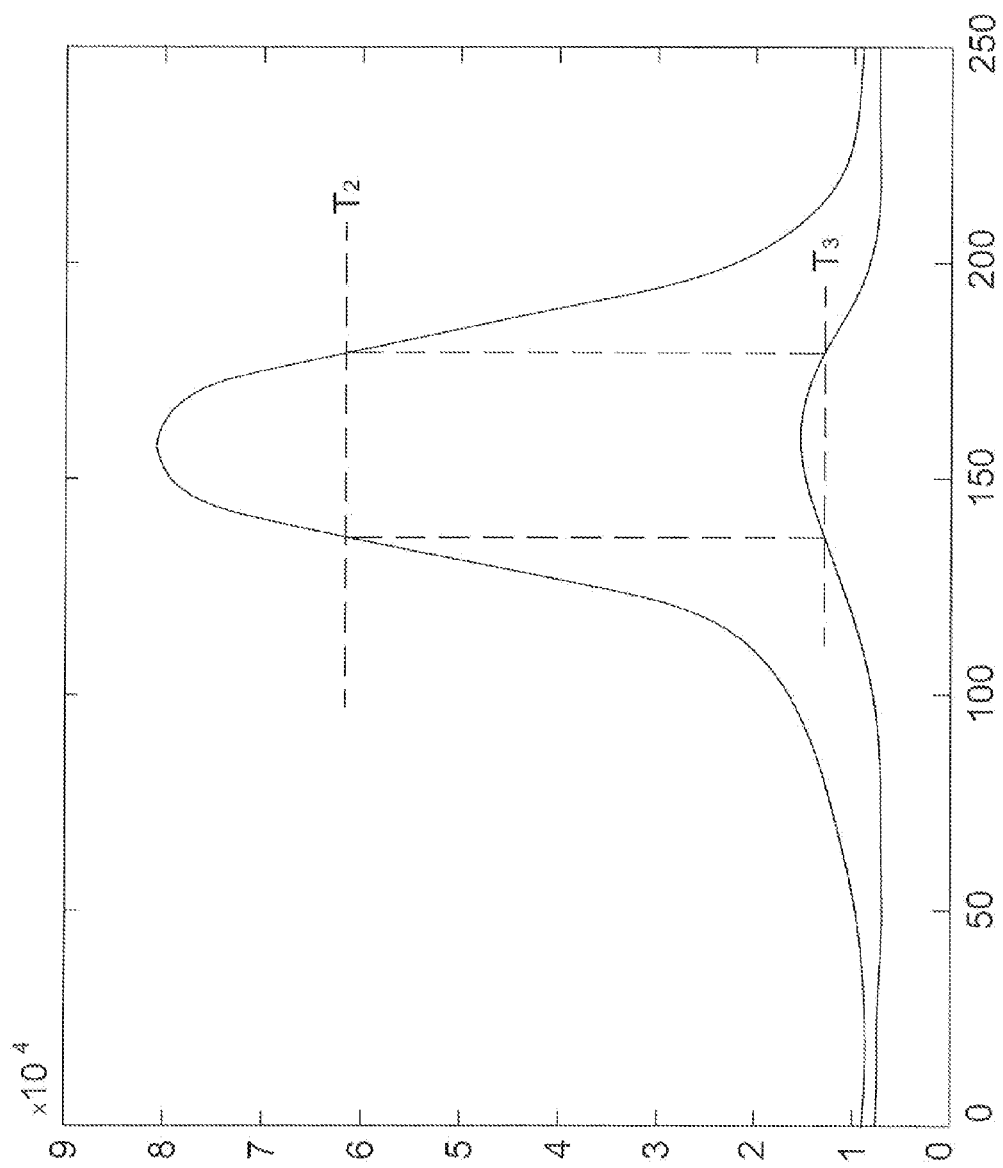
FIG. 4 shows a schematic diagram of light spot areas formed by acquiring the reflected light having different intensities reflected from the surface of the object by using the sensing module according to the embodiment of the present invention.
Figure 5:
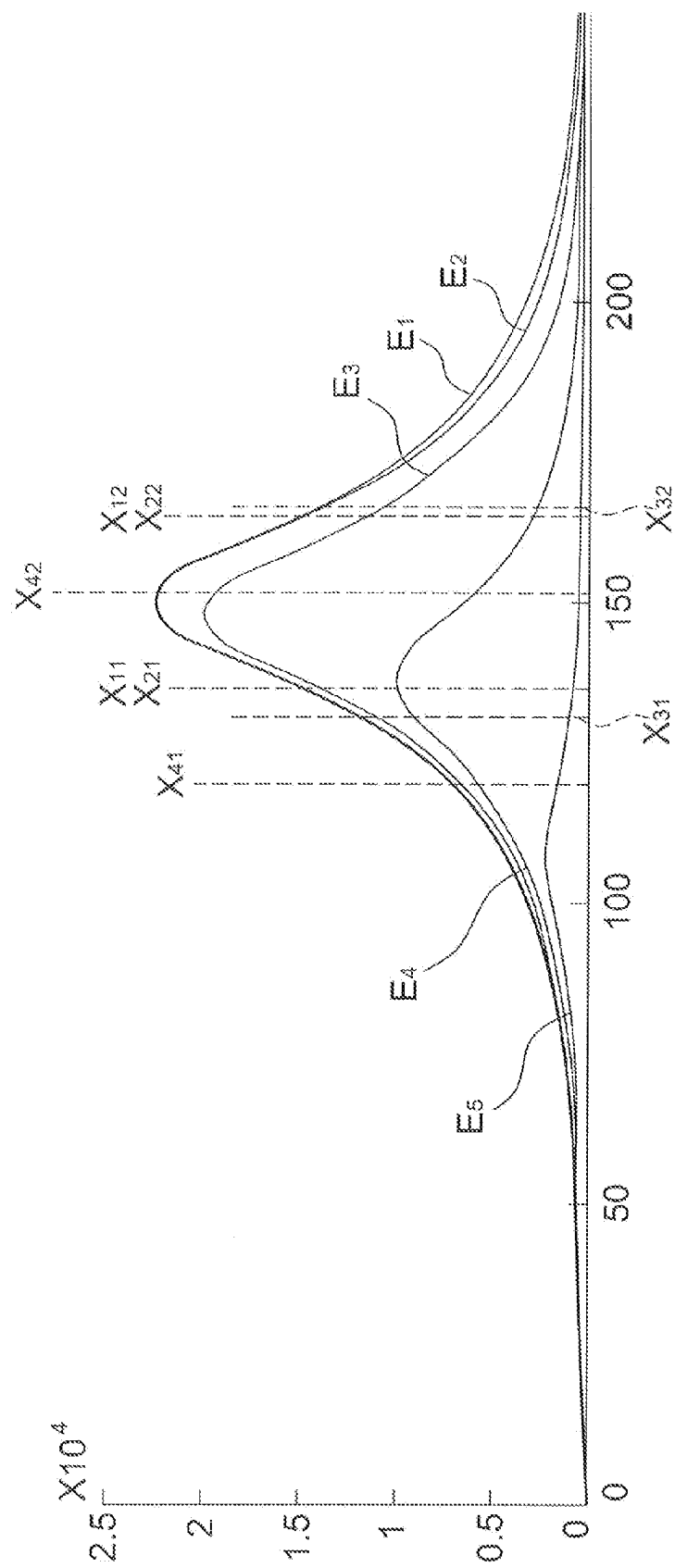
FIG. 5 shows a schematic diagram of different light spot areas formed by acquiring the reflected light reflected from the surface of the object by using the sensing module according to the embodiment of the present invention.

Please refer to FIG. 3, in the image outputted by the image processing unit 13, a transverse axis denotes, for example, the number of pixel columns included in the light sensing unit 11 and a longitudinal axis denotes, for example, the intensity sensed by every pixel column of the light sensing unit 11 (definitions of the transverse axis and the longitudinal axis are identical in FIGS. 3 to 5), wherein values shown in every figure are only exemplary. It is appreciated that if the image processing unit 13 is a one-dimensional sensor, an one-dimensional intensity curve (or energy curve) may be directly generated as shown in FIGS. 3 to 5; however, if the image processing unit 13 is a two-dimensional sensor, the image processing unit 13 may first perform image processing of the dimension conversion to convert the acquired image from two-dimension to one-dimension and then generate the one-dimensional intensity curve shown in FIGS. 3 to 5.

In FIG. 3, it is assumed that the intensity exceeding a predetermined threshold $T_{min}$ forms a light spot area of the reflected light. In order to calculate an image position of the light spot (i.e. a light spot position) forming on the light sensing unit 11, the calculation unit 14 may further process the light spot area in the image. For example in one embodiment, the calculation unit 14 may define a light spot region which has an intensity higher than a half intensity of the light spot area, e.g. the half intensity may be obtained by subtracting the minimum intensity (i.e. $T_{min}$) from the maximum intensity $T_{max}$ of the light spot area shown in FIG. 3 to obtain an intensity difference, and then dividing the intensity difference by 2 and adding the minimum intensity (i.e. $T_{min}$) again to obtain an intensity T1, wherein the intensity T1 may be served as the half intensity of the light spot area herein. In this embodiment, a region within the light spot area higher than the intensity T1 may be defined as a light spot region which may be used to determine an image size of the light spot (i.e. a detected light spot size). A gravity center of the region within the light spot area above the intensity T1 may be served as an image position of the light spot (i.e. a light spot position). The gravity center of a light spot region may be defined as a sum of the multiplication of every pixel position and its corresponding pixel energy divided by a total energy within the light spot region, i.e. an energy center of the light spot region. The calculation unit 14 may calculate the distance between the object 30 and the light source 20 according to the gravity center, the focal length f of the detection lens 41, and the distance between the detection device 10 and the light source 20. It is appreciated that the light spot position of the present invention is not limited to the gravity center of the light spot region. The light spot position may also be defined as a position of the maximum value or other positions of the energy curve, as long as the same position of the light spot region is always used in the calculation process.

Please refer to FIG. 4, it shows light spot areas generated by the reflected light from the surface of the object 30 having different reflection coefficients. It is appreciated that, when the surface of the object has a higher reflection coefficient, the light sensing unit 11 senses a light spot having a larger intensity; on the contrary, when the surface of the object has a lower reflection coefficient, the light sensing unit 11 senses a light spot having a lower intensity. As shown in FIG. 4, under the same emission condition of the light source 20, the light sensing unit 11 acquires different intensity curves due to different reflection coefficients of the surface of the object 30; however, the light spot region obtained according to the above method (e.g. regions within a full width at half maximum $T_2$ and $T_3$) still has a substantially identical size. Accordingly, under the same emission condition of the light source 20, the light sensing unit 11 can detect the light spot having a substantially identical light spot size even the surface of the object 30 has different reflection coefficients. In other words, the present invention may be adapted to any object having a substantially flat surface.

In addition, if the object 20 is close to the light source 20, the light sensing unit 11 senses a light spot having a larger intensity. On the contrary, if the object 20 is far away from the light source 20, the light sensing unit 11 senses a light spot having a smaller intensity. As shown in FIG. 4, the light sensing unit 11 acquires different intensity curves when the object is at different distances; however, the light spot region obtained according to the above method (e.g. regions within a full width at half maximum $T_2$ and $T_3$) still has a substantially identical size. Accordingly, light spot sizes of the light spot region generated by the light sensing unit 11 are substantially identical even though the object is at different distances.

As mentioned above, no matter what is the reflection coefficient of the surface of the object 30 and the distance between the object 30 and the light source 20 (or the emission lens 42), as long as the light source 20 completely illuminates the object 30 with its illumination region, the calculation unit 13 may obtain a light spot region having a substantially identical size (i.e. the predetermined light spot size mentioned above). The present invention utilizes this property to compensate a detected light spot position. When the object 30 is partially illuminated by the light source 20, not all predetermined amount of the light emitted by the light source 20 can be reflected to the light sensing unit 11. Thus the image size of the light spot (i.e. the light spot size) on the light sensing unit 11 will smaller than the predetermined light spot size, and generally the image will incline to one of the two sides of the energy curve to break symmetry. If we use this gravity center (or other positions of the light spot region) to calculate the light spot position, the light spot position may not be obtained correctly due to the size variation and the position deviation of the light spot.

In a word, the detection device 10 of the present invention may first identify whether the image of a detected light spot is a complete light spot or a partial light spot. Since the light spot projected by a fixed light source has substantially identical image size under identical condition, the image size may be previously stored in the memory unit 15 as a predetermined light spot size. The calculation unit 14 compares a detected light spot size with the predetermined light spot size stored in the memory unit 15 every time before calculating the distance so as to identify whether the image of the detected light spot is a complete light spot or not.

Please refer to FIGS. 1 and 5 together, FIG. 5 shows different light spots formed by the reflected light when the object 30 is gradually leaving the illumination region of the light source 20 from the left side of FIG. 1; wherein $E_1$ is the energy curve formed when 100% (light spot ratio is 1) of predetermined amount of the projected light is reflected to the light sensing unit 11; $E_2$ is the energy curve formed when 80% (light spot ratio is 0.8) of predetermined amount of the projected light is reflected to the light sensing unit 11; $E_3$ is the energy curve formed when 60% (light spot ratio is 0.6) of predetermined amount of the projected light is reflected to the light sensing unit 11; $E_4$ is the energy curve formed when 40% (light spot ratio is 0.4) of predetermined amount of the projected light is reflected to the light sensing unit 11; and $E_5$ is the energy curve formed when 20% (light spot ratio is 0.2) of predetermined amount of the projected light is reflected to the light sensing unit 11. It is appreciated that the energy curves shown in FIG. 5 are only exemplary.

As shown in FIG. 5, using the method mentioned above to determine a light spot region (i.e. energy within full width at half maximum, FWHM), the light spot region of $E_1$ is $X_{11}$ to $X_{12}$; the light spot region of $E_2$ is $X_{21}$ to $X_{22}$; the light spot region of $E_3$ is $X_{31}$ to $X_{32}$; the light spot region of $E_4$ is $X_{41}$ to $X_{42}$; . . . . Therefore, even though the object 30 is at the same distance, the light sensing unit 11 may sense the light spot region having different image sizes. Therefore, it is able to identify whether the image of a detected light spot is complete or not by identifying the light spot size.

Figure 6:
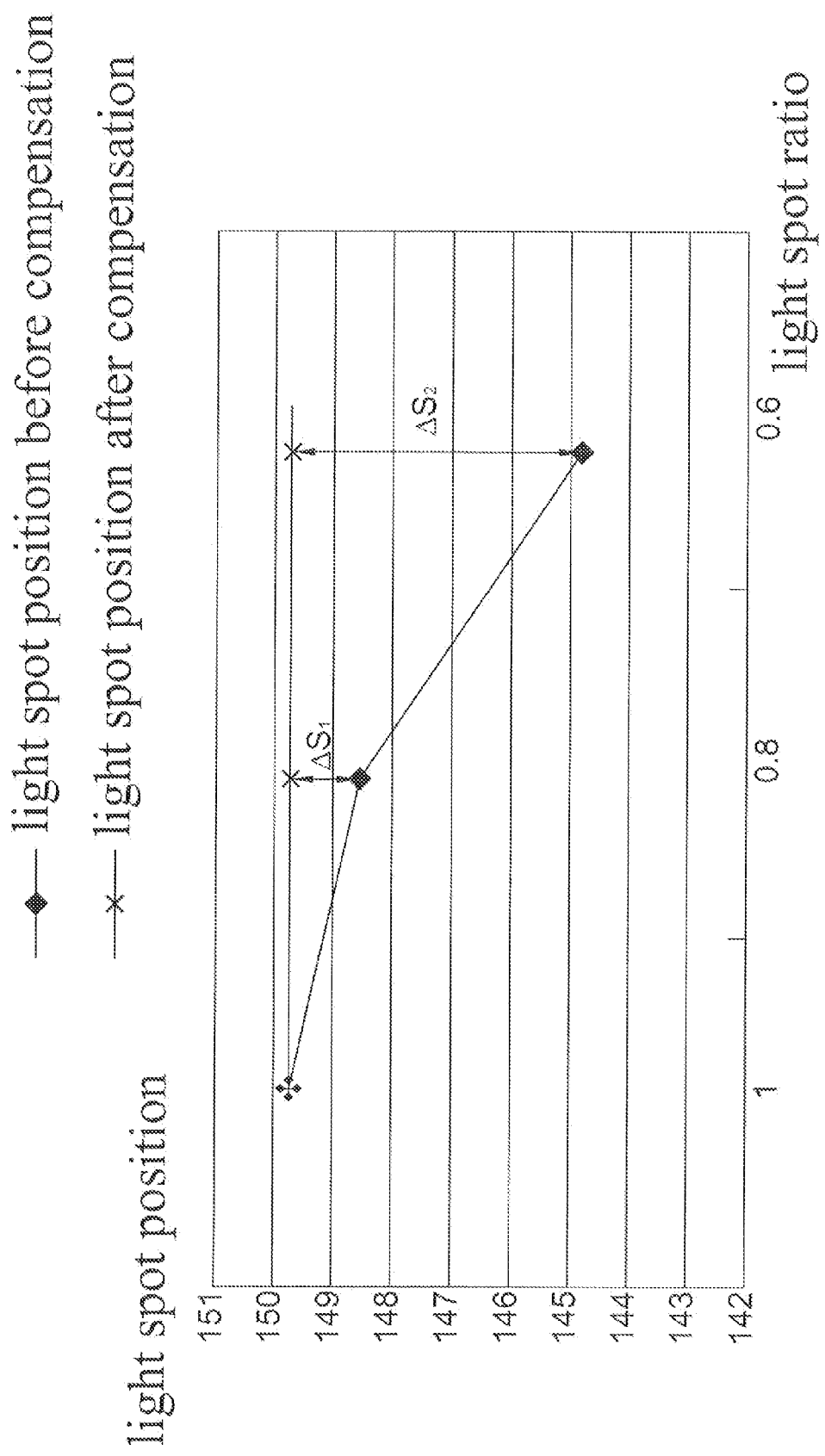
FIG. 6 shows a relationship diagram of the compensation amount of light spot position and the light spot ratio in the optical distance detection system according to the embodiment of the present invention.

Please refer to FIG. 6, it shows a relationship diagram of the compensation amount of light spot position and the light spot ratio in the optical distance detection system according to the embodiment of the present invention. When the calculation unit 14 identifies that a detected light spot size is smaller than the predetermined light spot size stored in the memory unit 15, the calculation unit 14 compensates the detected light spot position according to a size difference between the detected light spot size and the predetermined light spot size (e.g. the light spot ratio), then calculates the distance between the object 30 and the light source 20 according to a compensated light spot position. For example in FIG. 6, when the light spot ratio is 0.8, the compensation amount of light spot position is $\Delta S_1$; and when the light spot ratio is 0.6, the compensation amount of light spot position is $\Delta S_2$. In addition, based on the system requirement, the calculation unit 14 may stop calculating the distance between the object 30 and the light source 20 or directly control the output unit 16 to stop outputting distance information when identifying an incomplete image of the light spot, and further inform the host the corresponding information such that the host can know that a correct distance may not be obtained in this round of distance detection. In another embodiment, only when identifying that the light spot ratio is smaller than a predetermined value (e.g. 0.5), the calculation unit 14 controls the output unit 14 to stop outputting the distance information.

When identifying that the detected light spot size is smaller than the predetermined light spot size stored in the memory unit 15, the calculation unit 14 calculates the light spot position (e.g. a gravity center) at first and identifies whether the light spot position deviates toward left or right in the transverse axis, i.e. identifying the symmetry deviation of the intensity curve. When the light spot position deviates toward left on the transverse axis and a difference between the detected light spot size and the predetermined light spot size is M (e.g. M may be smaller than 1 if sub-pixel is taken as the unit), the light spot position may be shifted M pixel toward right to obtain a compensated light spot position. The distance D may then be calculated by using the compensated light spot position. Similarly, when the light spot position deviates toward right on the transverse axis, the light spot position may be shifted M pixel toward left to obtain a compensated light spot position, wherein the value of M may be the compensation amount of light spot position $\Delta S$ shown in FIG. 6. That is, in the present invention, the calculation unit 14 may also determine a compensation direction of the light spot position according a symmetry deviation of the intensity curve of the light spot. For example, the light spot may be divided into a left part and a right part by using a gravity center (e.g. an energy center within the FWHM of an energy curve of the light spot or a maximum position of the energy curve), and the compensation direction is toward left when the left part is smaller than the right part whereas the compensation direction is toward right when the right part is smaller than the left part. In other words, the compensation direction in the present invention may be selected as the smaller one of the left part or the right part of the light spot.

The compensation methods mentioned above are only exemplary, and a person skilled in the art may compensate the initial light spot position by using different compensation methods, and thus details will not be repeated herein.

As mentioned above, as conventional distance detection device is not able to compensate the detected light spot position, the distance may not be calculated or may be miscalculated. The present invention further provides an optical distance detection device and distance compensation method thereof capable of compensating the light spot position according to the variation of light spot size and the symmetry so as to increase the accuracy of the distance detection.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. An optical distance detection system, comprising:
   a light source configured to illuminate a surface of an object; and
   a detection device configured to receive reflected light from the surface of the object and output a distance of the object according to the reflected light, the detection device further comprising:
   a sensing module configured to receive the reflected light to accordingly generate an image; and
   a calculation module configured to
   compensate a light spot position according to a light spot size of a light spot formed by the reflected light on the image,
   determine a compensation direction according to symmetry of a one-dimensional energy curve of the light spot formed by the reflected light, and
   calculate and output the distance of the object according to the compensated light spot position.

2. The optical distance detection system as claimed in claim 1, wherein the sensing module further comprises:
   a light sensing unit configured to receive the reflected light and generate an electric signal; and
   an image processing unit configured to receive the electric signal and generate the image.

3. The optical distance detection system as claimed in claim 1, wherein the calculation module further comprises:
   a calculation unit configured to receive the image, compensate the light spot position according to the light spot size of the light spot, and calculate the distance according to the compensated light spot position; and
   an output unit configured to receive the distance obtained by the calculation unit and output the distance.

4. The optical distance detection system as claimed in claim 3, wherein
   the calculation module further comprises a memory unit configured to store a predetermined light spot size; and
   the calculating unit is configured to compare the light spot size and the predetermined light spot size after receiving the image, and compensate the light spot position according to a comparison result of the light spot size and the predetermined light spot size.

5. The optical distance detection system as claimed in claim 4, wherein
the calculation unit is configured to calculate the distance according to the light spot position, which is uncompensated, when the light spot size is equal to the predetermined light spot size; and
the calculation unit is configured to
compensate the light spot position according to a size difference between the light spot size and the predetermined light spot size when the light spot size is smaller than the predetermined light spot size, and
calculate the distance according to the compensated light spot position.

6. The optical distance detection system as claimed in claim 5, wherein
the light spot position is a gravity center of the light spot; and
the calculation unit is configured to compensate the gravity center when compensating the light spot position, and calculate the distance according to the compensated gravity center.

7. The optical distance detection system as claimed in claim 6, wherein the gravity center is an energy center within a full width at half maximum of the one-dimensional energy curve or a maximum position of the one-dimensional energy curve.

8. The optical distance detection system as claimed in claim 7, wherein the calculation unit is further configured to determine the compensation direction of the gravity center according to the symmetry of the one-dimensional energy curve.

9. The optical distance detection system as claimed in claim 8, wherein
the light spot is divided into a left part and a right part by the gravity center of the one-dimensional energy curve,
one of the left part and the right part is smaller than the other, and
the compensation direction is oriented toward the smaller one of the left part and the right part.

10. The optical distance detection system as claimed in claim 5, wherein
the size difference is a light spot ratio obtained by dividing the light spot size to the predetermined light spot size; and
the memory unit is configured to store a lookup table of the light spot ratio and a compensation amount of light spot position.

11. An optical distance detection system, comprising:
a light source configured to illuminate a surface of an object;
a detection lens; and
a detection device configured to
detect a light spot formed by reflected light on the detection device, the reflected light reflected from the surface of the object, penetrating the detection lens and incident on the detection device,
compensate a light spot position according to a light spot size of the light spot, and
determine a compensation direction of the light spot position according to symmetry of a one-dimensional energy curve of the light spot.

12. The optical distance detection system as claimed in claim 11, wherein
the light spot is divided into a left part and a right part by a gravity center of the one-dimensional energy curve,
one of the left part and the right part is smaller than the other, and
the compensation direction is oriented toward the smaller one of the left part and the right part.

13. The optical distance detection system as claimed in claim 11, wherein the detection device further comprises a memory unit configured to store a predetermined light spot size and a lookup table of a light spot ratio and a compensation amount of light spot position, wherein the light spot ratio is obtained by dividing the light spot size to the predetermined light spot size.

14. The optical distance detection system as claimed in claim 13, wherein the detection device is configured to compensate the light spot position according to the light spot size and the lookup table.

15. The optical distance detection system as claimed in claim 14, wherein the detection device is configured to
calculate a distance according to the light spot position, which is uncompensated, when the light spot ratio is equal to 1; and
calculate the distance according to the compensated light spot position when the light spot ratio is less than 1.

16. The optical distance detection system as claimed in claim 15, wherein the detection device is further configured to output the distance to a host.

17. The optical distance detection system as claimed in claim 11, wherein the light spot position is an energy center within a full width at half maximum of the one-dimensional energy curve or a maximum position of the one-dimensional energy curve.

18. The optical distance detection system as claimed in claim 11, wherein
the detection device further comprises a sensing module and a calculation module;
the sensing module is configured to acquire an image containing the light spot;
the calculation module is configured to calculate the light spot size and the one-dimensional energy curve of the light spot according to the image, to compensate the light spot position according to the light spot size, and to determine the compensation direction according to the symmetry of the one-dimensional energy curve.

19. The optical distance detection system as claimed in claim 18, wherein
the sensing module further comprises a light sensing unit and an image processing unit;
the light sensing unit is configured to detect the reflected light to generate an electric signal, and
the image processing unit is configured to generate the image containing the light spot according to the electric signal.

20. An optical distance detection system, comprising:
a light source configured to illuminate a surface of an object;
a detection lens; and
a detection device configured to
detect a light spot formed by reflected light on the detection device, the reflected light reflected from the surface of the object, penetrating the detection lens and incident on the detection device, and
determine a compensation direction of a light spot position of the light spot according to symmetry of a one-dimensional energy curve of the light spot.

* * * * *